United States Patent
Switkes et al.

(10) Patent No.: US 12,195,046 B2
(45) Date of Patent: Jan. 14, 2025

(54) HANDLING MANEUVER LIMITS FOR AUTONOMOUS DRIVING SYSTEMS

(71) Applicant: Waymo LLC, Mountain View, CA (US)

(72) Inventors: Joshua P Switkes, Mountain View, CA (US); Andrew Barton-Sweeney, Oakland, CA (US); Vadim Butakov, Hayward, CA (US); Diomidis Katzourakis, San Jose, CA (US); Craig Latimer, Lafayette, CA (US); David Smith, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 127 days.

(21) Appl. No.: 17/364,289

(22) Filed: Jun. 30, 2021

(65) Prior Publication Data
US 2023/0001955 A1 Jan. 5, 2023

(51) Int. Cl.
*B60W 60/00* (2020.01)
(52) U.S. Cl.
CPC ............... *B60W 60/00186* (2020.02); *B60W 60/0011* (2020.02); *B60W 2300/145* (2013.01); *B60W 2510/18* (2013.01); *B60W 2520/14* (2013.01); *B60W 2552/30* (2020.02)
(58) Field of Classification Search
CPC ....... B60W 60/00186; B60W 60/0011; B60W 2300/145; B60W 2510/18; B60W 2520/14; B60W 2552/30
See application file for complete search history.

(56) References Cited

U.S. PATENT DOCUMENTS

| | | | |
|---|---|---|---|
| 10,752,075 B1 | 8/2020 | Shukla et al. | |
| 2001/0007965 A1* | 7/2001 | Yokoyama | B60T 8/1755 180/197 |
| 2006/0122758 A1* | 6/2006 | Bauer | B60R 16/0233 340/440 |
| 2009/0062984 A1 | 3/2009 | Poilbout | |
| 2011/0022267 A1* | 1/2011 | Murphy | B60W 50/14 701/124 |

(Continued)

FOREIGN PATENT DOCUMENTS

| | | |
|---|---|---|
| JP | 2004198176 A | 7/2004 |
| KR | 19990002082 A | 1/1999 |
| WO | 2021098974 A1 | 5/2021 |

OTHER PUBLICATIONS

English translation of WO 2021098974.
English translation of KR 19990002082.
English translation of JP 2004198176.

*Primary Examiner* — Jean Paul Cass
*Assistant Examiner* — Alexander George Matta
(74) *Attorney, Agent, or Firm* — Lowenstein Sandler LLP

(57) ABSTRACT

A method includes identifying mass distribution data of an autonomous vehicle (AV). The mass distribution data is associated with a first load proximate a first distal end of a first axle of the AV and a second load proximate a second distal end of the first axle of the AV. The method further includes determining, based on the mass distribution data, one or more handling maneuver limits for the AV. The method further includes causing the AV to travel a route based on the one or more handling maneuver limits.

23 Claims, 5 Drawing Sheets

(56) References Cited

U.S. PATENT DOCUMENTS

| | | |
|---|---|---|
| 2011/0276265 A1* | 11/2011 | Husain ............ G08G 1/096827 |
| | | 701/533 |
| 2019/0111923 A1* | 4/2019 | Arquero ............... G08G 1/0141 |
| 2019/0160892 A1 | 5/2019 | Esnault et al. |
| 2019/0176811 A1 | 6/2019 | Cho et al. |
| 2019/0276009 A1* | 9/2019 | Okada .................. B60W 40/114 |
| 2020/0041297 A1* | 2/2020 | Garbelli .................. B60C 23/20 |
| 2020/0172109 A1* | 6/2020 | Son ....................... B60W 40/13 |
| 2021/0370739 A1 | 12/2021 | Seo |
| 2022/0065644 A1* | 3/2022 | Kundu ............... G01C 21/3461 |
| 2022/0196042 A1* | 6/2022 | Froemming .......... E02F 9/2228 |
| 2022/0289038 A1* | 9/2022 | Yokoo .................... B60K 37/06 |
| 2022/0324466 A1* | 10/2022 | Gonzalez Bautista ...................... |
| | | B60W 30/18145 |

\* cited by examiner

HANDLING MANEUVER LIMITS FOR AUTONOMOUS DRIVING SYSTEMS

TECHNICAL FIELD

The instant specification generally relates to autonomous vehicles. More specifically, the instant specification relates to implementing handling maneuver limits for the autonomous vehicles.

BACKGROUND

An autonomous vehicle (AV) operates by sensing an outside environment with various sensors and charting a driving path through the environment based on the sensed data, Global Positioning System (GPS) data, and road map data. Among the autonomous vehicles are trucks used for long-distance load deliveries. Trucking industry is sensitive to various costs such as fuel costs, maintenance, and repairs. To improve fuel efficiency, reduce collision risk, and reduce wear-and-tear of vehicles, human truck drivers use a variety of driving techniques, such as maintaining a constant speed whenever possible, accelerating through downhill sections of the road in order to acquire an additional momentum to carry the vehicle into subsequent uphill sections, and other techniques, which can be equally useful for autonomous vehicles. Successful implementations of such methods, however, can depend on the road and vehicle conditions. Higher efficiency is usually achieved when traffic is light. Conversely, presence of a large number of other trucks, carrying different loads and moving with different speeds, as well as passenger cars, motorhomes, and other vehicles is often detrimental to driving performance. Challenging weather conditions can introduce further uncertainty and increase costs while negatively affecting expected delivery times.

BRIEF DESCRIPTION OF THE DRAWINGS

The disclosure is illustrated by way of examples, and not by way of limitation, and can be more fully understood with references to the following detailed description when considered in connection with the figures, in which.

SUMMARY

Figure 1:
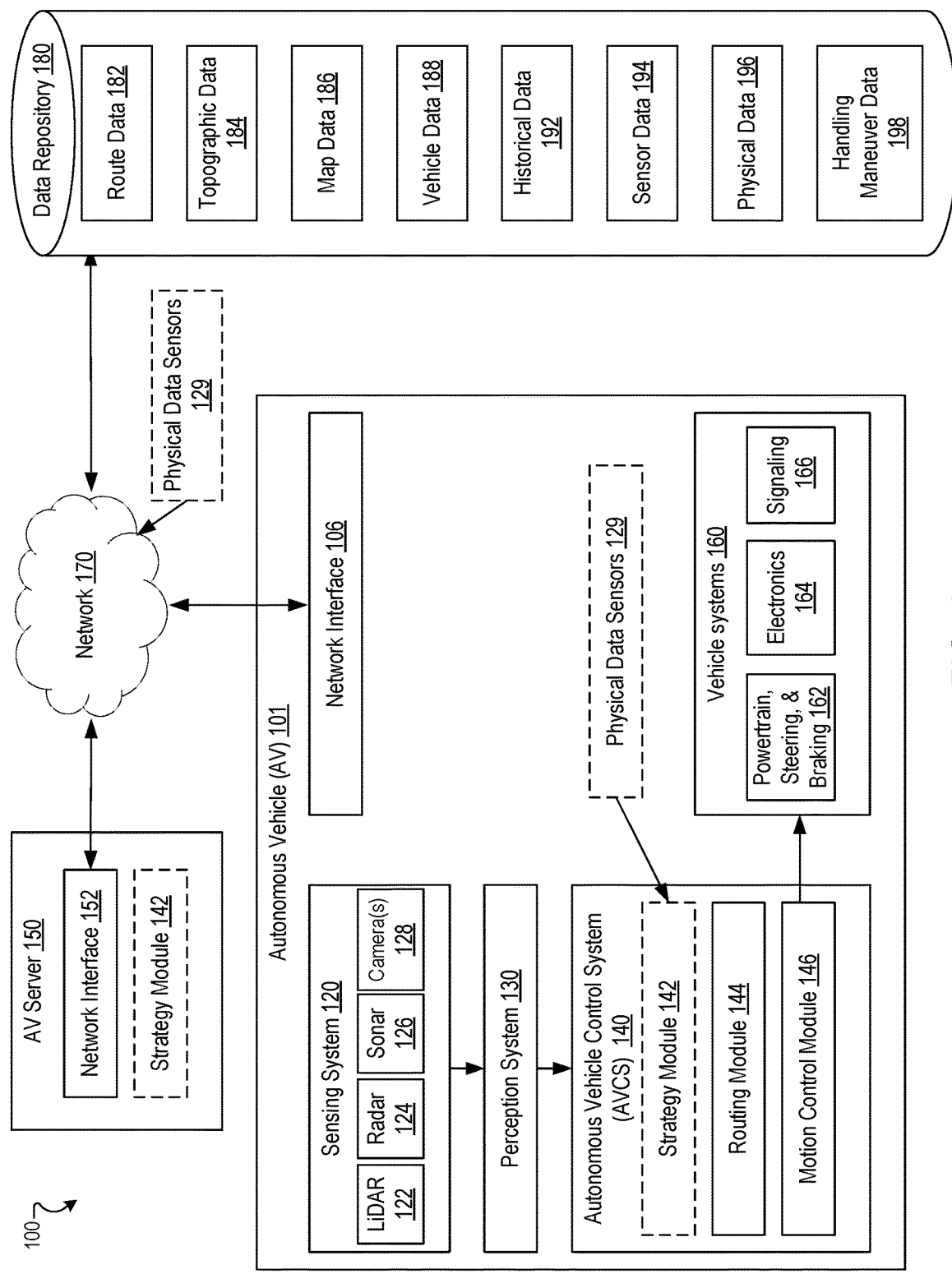
FIG. 1 is a diagram illustrating components of an example architecture of a system that provides handling maneuver limits based on mass distribution data for an autonomous vehicle (AV), in accordance with some embodiments of the disclosure.

In one embodiment, disclosed is a method includes identifying mass distribution data of an autonomous vehicle (AV). The mass distribution data is associated with a first load proximate a first distal end of a first axle of the AV and a second load proximate a second distal end of the first axle of the AV. The method further includes determining, based on the mass distribution data, one or more handling maneuver limits for the AV. The method further includes causing the AV to travel a route based on the one or more handling maneuver limits.

In another embodiment, disclosed is a system including a memory device and a processing device coupled to the memory device. The processing device is to identify mass distribution data of an autonomous vehicle (AV). The mass distribution data is associated with a first load proximate a first distal end of a first axle of the AV and a second load proximate a second distal end of the first axle of the AV. The processing device is further to determine, based on the mass distribution data, one or more handling maneuver limits for the AV. The processing device is further to cause the AV to travel a route based on the one or more handling maneuver limits.

In another embodiment, disclosed is a non-transitory computer-readable storage medium having instructions stored thereon that, when executed by a processing device, cause the processing device to identify mass distribution data of an autonomous vehicle (AV). The mass distribution data is associated with a first load proximate a first distal end of a first axle of the AV and a second load proximate a second distal end of the first axle of the AV. The processing device is further to determine, based on the mass distribution data, one or more handling maneuver limits for the AV. The processing device is further to cause the AV to travel a route based on the one or more handling maneuver limits.

DETAILED DESCRIPTION

A vehicle (e.g., truck) includes wheels and axles that are used to cause the vehicle to travel over a route from a starting location to a destination. The vehicle contacts the roadway via the wheels. One or more wheels are coupled to each distal end of each axle. The axle transmits driving torque from the vehicle to the corresponding wheels and/or maintains the position of the wheels relative to each other and to the vehicle body. Axle load of a wheeled vehicle is the total weight bearing on the roadway for all wheels connected to a given axle. Vehicles can have different physical characteristics associated with physical data (e.g., mass, mass distribution) based on the construction of a vehicle (e.g., tractor, one or more trailers) and the cargo (e.g., cargo weight, cargo distribution, etc.) being carried by the vehicle. Mass distribution (e.g., center of gravity (COG)) is associated with different loads on different distal ends of axles. Different physical data can cause vehicles to have different likelihoods of rolling over, being able to perform an evasive maneuver, etc. For example, a vehicle that has a greater mass may use a greater amount of time to slow down than a vehicle that has a smaller mass. In another example, a vehicle that has a higher vertical COG may have greater likelihood of rolling responsive to an evasive maneuver than a vehicle that has a lower vertical COG.

An autonomous vehicle (AV) performs vehicle actions, such as braking, steering, and drive torque application (e.g., throttling), to move the AV from the starting location to the destination location along a route. The AV receives route data (e.g., from a server) that includes particular roads to travel from the starting location to the destination location. The AV also receives sensor data from a perception system (e.g., vehicle sensors) that indicates locations of other objects. The AV uses the sensor data and the route data to control the AV. Conventional AVs travel the same regardless of the mass and the mass distribution of the AV. This can cause AVs to either travel overly conservatively (e.g., assuming the worst case scenario of mass or mass distribution) or to travel dangerously (e.g., assuming a best case scenario of mass or mass distribution). An AV travelling overly conservatively results in inefficient use of time, fuel inefficiency, and wear-and-tear on the vehicle. An AV travelling dangerously can cause the vehicle to roll over, be in a collision, etc.

Aspects of the disclosure address the above challenges along with others, by providing handling maneuver limits for an AV. Handling maneuver limits can include one or more parameters (e.g., lateral acceleration, longitudinal acceleration, braking, speed, etc.) that are to be limited based on physical data (e.g., mass, mass distribution data, COG, etc.) of the AV.

In some embodiments, a processing device (e.g., located in a server or onboard the AV) identifies physical data of an AV. The physical data may include mass (e.g., total mass) and/or mass distribution data (e.g., COG, etc.) of the AV. The physical data may be for the tractor and one or more trailers that are being transported (e.g., pulled) by the tractor. At least a portion of the physical data (e.g., mass distribution data) may be associated with a first load proximate a first distal end of a first axle of the AV and a second load proximate a second distal end of the first axle of the AV. In some embodiments, the physical data (e.g., mass, mass distribution data) is of a tractor (e.g., vehicle) (e.g., COG of the tractor). In some embodiments, the physical data is of a single trailer (e.g., COG of a single trailer). In some embodiments, the physical data is of multiple trailers (e.g., COG of a combination of trailers). In some embodiments, the physical data is of a combination of a tractor and one or more trailers (e.g., COG of a combination of the tractor and one or more trailers).

The processing device determines, based on the physical data (e.g., mass, mass distribution data), one or more handling maneuver limits for the AV. The handling maneuver limits may include one or more of acceleration limits, braking limits, speed limits, turning limits, lateral acceleration limits, in which lanes to travel, what route to use, and/or the like. The handling maneuver limits may include limits of rates of change, such as jerk (e.g., rate of change of acceleration) limits, braking jerk (e.g., rate of change of braking) limits, lateral jerk (e.g., rate of change of lateral acceleration) limits, and/or the like.

The processing device causes the AV to travel a route based on the one or more handling maneuver limits.

Aspects and embodiments disclosed herein provide numerous advantages over existing technologies. By identifying physical data (e.g., mass, mass distribution data) of the AV, dangerous handling maneuvers can be avoided which avoids vehicle roll-overs, collisions, wear-and-tear on the vehicle, and/or the like. By identifying physical data (e.g., mass, mass distribution data) of the AV, overly conservative travelling can be avoided which increases fuel-efficiency, uses less time, avoids wear-and-tear on the vehicle, and/or the like. By causing the AV to travel based on handling maneuver limits, safer and more efficient routes, lanes, acceleration, braking, speeds, and/or the like can be selected.

FIG. 1 is a diagram illustrating components of an example architecture 100 of a system that provides handling maneuver limits for an autonomous vehicle (AV) 101, in accordance with some embodiments of the disclosure. Although alternatively referred to as "trucks," autonomous vehicles can include any motor vehicles, such as cars, tractors (with or without trailers), buses, motorcycles, all-terrain vehicles, recreational vehicles, any specialized farming or construction vehicles, and the like), or any other self-propelled vehicles capable of being operated in a self-driving mode (without a human input or with a reduced human input). Autonomous vehicles can include vehicles with various levels of autonomy, such as level 2 (partial autonomy) through level 5 (full autonomy). Autonomous vehicles can include vehicles using an internal combustion engine (e.g., gas engine, diesel engine, etc.), an electric engine (motor), or combination thereof (e.g., hybrid AV). AV 101 can be capable of traveling on paved and/or unpaved roadways, off-road, on various surfaces encountered on farming (or other agricultural) land, within a driving environment (including indoor environment) of an industrial plant, and so on.

AV 101 can include a sensing system 120. The sensing system 120 can include various electromagnetic (e.g., optical) and non-electromagnetic (e.g., acoustic) sensing subsystems and/or devices that can be used in object sensing to facilitate autonomous driving, e.g., distance sensing, velocity sensing, acceleration sensing, rotational motion sensing, and so on. For example, optical sensing can utilize a range of light visible to a human eye (e.g., the 380 to 400 nanometer (nm) wavelength range), the UV range (below 380 nm), the infrared range (above 400 nm), the radio frequency range (above 1 m), etc. In embodiments, "optical" can include any other suitable range of the electromagnetic spectrum.

The sensing system 120 can include one or more LiDAR sensors 122 (e.g., a LiDAR rangefinders), which can be laser-based units capable of determining distances (e.g., using time-of-flight (ToF) technology) to the objects in the environment around AV 101. For example, LiDAR sensor(s) 122 can emit one or more laser signals (pulses) that travel to an object and then detect arrived signals reflected from the object. By determining a time delay between the signal emission and the arrival of the retro-reflected waves, a ToF LiDAR sensors 122 can determine the distance to the object. LiDAR sensor(s) 122 can emit signals in various directions to obtain a wide view of the outside environment. LiDAR sensor(s) 122 can utilize wavelengths of electromagnetic waves that are shorter than the wavelength of the radio waves and can, therefore, provide a higher spatial resolution and sensitivity compared with the radar unit 124. In some embodiments, LiDAR sensor(s) 122 can be (or include) coherent LiDAR sensor(s), such as a frequency-modulated continuous-wave (FMCW) LiDAR sensor(s). FMCW LiDAR sensor(s) (or some other coherent LiDAR sensors) can use optical heterodyne detection for instant velocity determination. LiDAR sensor(s) 122 can include one or more laser sources producing and emitting signals and one or more detectors of the signals reflected back from the objects, one or more spectral filters to filter out spurious electromagnetic waves having wavelengths (frequencies) that are different from the wavelengths (frequencies) of the emitted signals, one or more directional filters (e.g., apertures, diffraction gratings, and so on) to filter out electromagnetic waves that arrive at the detectors along directions different from the directions of the emitted signals, and other components that can enhance sensing capabilities of the LiDAR sensor(s) 122. In some embodiments, LiDAR sensor(s) 122 can ensure a 360-degree view in a horizontal direction and up to 90 degrees in the vertical direction.

The sensing system 120 can include one or more radar units 124, which can be any system that utilizes radio or microwave frequency signals to sense objects within the driving environment of the AV 101. The radar unit(s) 124 can be configured to sense both the spatial locations of the objects (including their spatial dimensions) and their velocities (e.g., using the Doppler shift technology), such as translational velocities and angular (rotational) velocities. Sensing system 120 can also include one or more sonars 126, which can be ultrasonic sonars, in some embodiments.

Sensing system 120 can further include one or more cameras 128 to capture images of the driving environment. The images can be two-dimensional projections of the driving environment (or parts of the driving environment) onto a projecting plane (flat or non-flat, e.g. fisheye) of the cameras. Some of cameras 128 of sensing system 120 can be video cameras configured to capture a continuous (or quasi-continuous) stream of images of the driving environment.

The sensing data obtained by sensing system 120 can be processed by a perception system 130 that can be configured to detect and track objects in the driving environment and to identify the detected objects. For example, perception system 130 can analyze images captured by cameras 128 and can be capable of detecting traffic light signals, road signs, roadway layouts (e.g., boundaries of traffic lanes, topologies of intersections, designations of parking places, and so on), presence of obstacles, and the like. Perception system 130 can further receive the LiDAR sensing data (coherent Doppler data and incoherent ToF data) to determine distances to various objects in the environment and velocities of such objects. In some embodiments, perception system 130 can use the LiDAR data in combination with the data captured by the camera(s) 128. In one example, the camera(s) 128 can detect an image of a rock partially obstructing a traffic lane. Using the data from the camera(s) 128, the perception system 130 can be capable of determining the angular size of the rock, but not the linear size of the rock. Using the LiDAR data, perception system 130 can determine the distance from the rock to the AV and, therefore, by combining the distance information with the angular size of the rock, perception system 130 can determine the linear dimensions of the rock as well.

In another embodiment, using the LiDAR data, perception system 130 can determine how far a detected object is from the AV and can further determine the component of the object's velocity along the direction of the AV's motion. Furthermore, using a series of quick images obtained by the camera, perception system 130 can also determine the lateral velocity of the detected object in a direction perpendicular to the direction of the AV's motion. In some embodiments, the lateral velocity can be determined from the LiDAR data alone, for example, by recognizing an edge of the object (using horizontal scanning) and further determining how quickly the edge of the object is moving in the lateral direction.

Perception system 130 can further receive information from a GPS transceiver (not shown) configured to obtain information about the position of the AV relative to Earth and use the GPS data in conjunction with the sensing data to help accurately determine location of the AV with respect to fixed objects of the driving environment, such as roadways, lane boundaries, intersections, sidewalks, crosswalks, road signs, surrounding buildings, and so on, locations of which can be provided by map information accessible by perception system 130. In some embodiments, perception system 130 can receive non-electromagnetic data, such as sonar data (e.g., ultrasonic sensor data), temperature sensor data, pressure sensor data, meteorological data (e.g., wind speed and direction, precipitation data), or other environmental monitoring data.

In some embodiments, the perception system 130 can provide, generate, or be used to help generate sensor data 194 (e.g., environmental sensing data, scenario sensing data, GPS data, etc.) pertaining to a route of a vehicle. Herein "route" refers to a sequence of physical locations (e.g., geographic markers) that can be traveled by a target vehicle between a starting point ("start") and a destination point ("destination"). The start and/or the destination need not be the initial and final locations of the vehicle in the driving mission, but can be any two points (e.g., A and B) along such a mission. Accordingly, "mission" herein refers to any portion of the overall driving task.

Route data 182 can include information about the starting point, intermediate points and destination point of the route (e.g., longitude and latitude information of points along the route) and include physical characteristics of various routes. "Trajectory" refers to driving settings, specified for various locations along the route, and includes speed, throttle, brake, etc. control that determine progression of the vehicle along the route. For example, a trajectory can include throttle settings, T(L) as a function of the location L along the route, target speed of the vehicle S(L), gear selection sequences, and so on. The location L can be identified by the distance travelled, GPS coordinates, road markers (e.g., mileposts), or a combination thereof, or in any other way.

Topographic data 184 can include information about the topography of the roads (e.g., grade and radius of curvature, pitch, elevation, etc.) or topography along the route.

Map data 186 can include information about the road network along the route, such as the quality of road surfaces, number of lanes, connection between lanes (e.g., topology of lanes, interconnections of lanes, which lanes are next to each other, merging lanes, exit lanes, entrance lanes, etc.), regulatory speed limits (e.g., regulatory maximum speed limits, regulatory minimum speed limits), type and number of exit ramps, availability of gas stations, and so on. Map data 186 can also include traffic data that includes information about historic traffic patterns or current traffic conditions along or near the route.

Vehicle data 188 can include data about the AV 101. Vehicle data 188 can be physical vehicle data, such as total mass of the AV 101, braking capabilities of the AV (e.g., regenerative braking, friction braking, engine braking, downshifting, exhaust braking, using drive line retarders, etc.), transmission gear ratios of the AV, wheelbase data of the AV, engine capabilities of the AV, lateral dynamics data (e.g., how the AV reacts to winding roads), dimensions of the AV 101 (e.g., tractor, one or more trailers), etc.

Historical data 192 can include data, such as recommended lane data (e.g., to merge, historically it is better to be in a certain lane), historical wind data (e.g., particular road segments historically have a particular speed and direction of wind), traffic data (e.g., historically a certain amount of traffic at particular road segments at particular times or days, historically vehicles are at a particular speed on particular road segments at particular times or days, etc.). In some embodiments, the historical data 192 is collected from AVs 101 over time (e.g., via sensing system 120, via perception system 130, sent to AV server 150, etc.). The historical data 192 can be used as predictive data about future scenarios. For example, sensor data 194 can indicate that another vehicle is in an adjacent lane and has an engaged turn signal, the historical data 192 can include information indicating that historically, the vehicle will enter the same lane that AV 101 currently occupies in 3 seconds and will be approximately 3 meters in front of the AV 101 at that time. In some embodiments, forecast data (e.g., predicted data, estimated data, etc.) can be based on historical data. Historical data 192 can refer to collected historical data, estimated historical data, extrapolated data, forecast data, estimated data, predicted data, or the like. As used herein, instead of, in addition to, or included with historical data 192, forecast data (e.g., forecast traffic, forecast wind, forecast recommended lane, etc.), and the like can be used to generate physical data 196 and/or short time horizon route data.

Sensor data 194 (e.g., environmental sensing data) can include data obtained by sensing system 120 and/or include data from the perception system 130 that has been generated using the data from the sensing system 120. For example, sensor data 194 (e.g., environmental sensing data) can include information describing the environment of or proximate the AV 101 (e.g., position of other vehicles, obstacles, or other elements with respect to the AV 101). In some embodiments, sensor data 194 includes data obtained by physical data sensors 129.

In some embodiments, architecture 100 includes physical data sensors 129. The physical data sensors 129 can be part of the AV 101 (e.g., part of the sensing system 120 or separate from the sensing system 120) or remote from the AV 101. In some embodiments, the physical data sensors 129 include one or more of scales external to the AV 101, pressure sensors coupled to the AV, displacement sensors coupled to the AV, and/or the like. The sensor data 194 may include data obtained from the physical data sensors 129 responsive to the AV 101 being stationary, on a substantially horizontal surface, moving, and/or on a non-horizontal surface.

Physical data 196 (e.g., mass data, mass distribution data) may be generated by strategy module 142 based on sensor data 194. The physical data 196 may be associated with a first load proximate a first distal end of an axle and a second load proximate a second distal end of the axle (e.g., for one or more axles of AV 101). The physical data 196 may include one or more of total mass value of an AV, total mass value for an axle of an AV, mass values associated with different distal ends of one or more axles, weight values associated with different distal ends of one or more axles, pressure values associated with different distal ends of one or more axles (e.g., responsive to the AV 101 being leveled), displacement values associated with different distal ends of one or more axles (e.g., from lasers pointed at the trailer or the ground), a ratio of a first load proximate a first distal end of an axle to a second load proximate a second distal end of the axle, vertical COG, lateral COG, longitudinal COG, roll stiffness, moment of inertia, suspension stiffness data of the AV 101, and/or the like. In some examples, the sensor data 194 includes pressure values and/or displacement values from distal ends of one or more axles and the physical data 196 (generated by the strategy module 142 based on the sensor data 194) includes a COG of the AV.

The data generated by perception system 130 as well as various additional data (e.g., GPS data, route data 182, topographic data 184, map data 186, vehicle data 188, historical data 192, sensor data 194, physical data 196, and the like) can be used by an autonomous driving system, such as AV 101 control system (AVCS 140). The AVCS 140 can include one or more algorithms that control how AV 101 is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as vehicle systems 160 (e.g., the powertrain, steering and braking 162, vehicle electronics 164, and signaling 166), and other systems and components not explicitly shown in FIG. 1. In some embodiments, the algorithms and modules of AVCS 140 generate instructions to enforce handling maneuver data 198 (e.g., handling maneuver limits) via motion control module 146 (e.g., at steering and braking level) and/or via the routing module 144 (e.g., at the trajectory level). The powertrain, steering, and braking 162 can include an engine (internal combustion engine, electric engine (motor), and so on), transmission (e.g., transmission gears), differentials, axles, wheels, steering mechanism, braking mechanism, and other systems. The vehicle electronics 164 can include an on-board computer, engine management, ignition, communication systems, carputers, telematics, in-car entertainment systems, and other systems and components. The signaling 166 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, steering and braking 162 (or signaling 166), whereas other instructions output by the AVCS 140 are first delivered to the electronics 164, which can generate commands to the powertrain, steering and braking 162 and/or signaling 166.

In one example, the AVCS 140 can determine that an obstacle identified by perception system 130 is to be avoided by decelerating the vehicle until a safe speed is reached, followed by steering the vehicle around the obstacle. The AVCS 140 can output instructions to the powertrain, steering and braking 162 (directly or via the electronics 164) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain, steering and braking 162 (directly or via the electronics 164) to resume the previous speed settings of the vehicle.

In some embodiments, architecture 100 can also include AV server 150 to communicate relevant information to and receive relevant information from AV 101. For example, relevant information can include traffic information, weather information, route information, among other information. In some embodiments, AV server 150 can be, at least at times, communicating with AV 101 via network 170. In some embodiments, AV 101 can be connected to network 170 at most or all times. In some embodiments, AV 101 can establish connections to network 170 intermittently, when an appropriate network signal is available. In some embodiments, AV 101 can be connected to network 170 prior to starting the driving mission. Network 170 can use a wireless connection, such as a broadband cellular connection (e.g., 3G, 4G, 4G LTE, 5G, connection(s), and so on), a wireless local area network (WLAN), a wireless wide area network (WWAN), a wired connection, a satellite connection, or the like. Connection to network 170 can be facilitated via a network interface 106 (on the side of AV 101) and a network interface 152 (on the side of AV server 150). Network interfaces 106 and 152 can include antennas, network controllers, radio circuits, amplifiers, analog-to-digital and digital-to-analog converters, physical layers (PHY), media access control layers (MAC), and the like.

In some embodiments, architecture 100 can also include a data repository 180. In some embodiments, the data repository 180 is memory (e.g., random access memory), a drive (e.g., a hard drive, a flash drive), a database system, or another type of component or device capable of storing data. In some embodiments, data repository 180 includes multiple storage components (e.g., multiple drives or multiple databases) that span multiple computing devices (e.g., multiple server computers). In some embodiments, the data repository 180 stores one or more of route data 182, topographic data 184, map data 186, vehicle data 188, historical data 192, sensor data 194, physical data 196, and the like. In some embodiments, at least a portion of the data shown in FIG. 1 as being stored in data repository 180 is stored in AV server 150 and/or AV 101.

In some embodiments, architecture 100 includes a strategy module 142. In some embodiments, the strategy module 142 is hosted by the AV server 150. In some embodiments, the strategy module 142 is hosted by the AV 101 (e.g., in AVCS 140). In some embodiments, the AVCS 140 includes one or more of strategy module 142, routing module 144, and/or motion control module 146. The strategy module 142 may receive sensor data 194 from physical data sensors 129 and may generate physical data 196 (e.g., mass data, ratios, mass distribution data, COG, etc.) based on the sensor data 194. In some embodiments, the strategy module 142 generates handling maneuver data 198 (e.g., handling maneuver limits, driving constraints, etc.) based on one or more of route data 182, topographic data 184, map data 186, vehicle data 188, historical data 192, sensor data 194, and/or physical data 196.

In some embodiments, the strategy module 142 determines, based on the physical data 196, handling maneuver data 198 (e.g., handling maneuver limits) that is to be used by the AV to travel a route. In some embodiments, the handling maneuver data 198 includes one or more corrective actions associated with AV 101. A corrective action may be a main action (e.g., no first action to be corrected) or a corrective action may be a subsequent action (e.g., one or more first actions to be corrected). A corrective action may be referred to as an action, a driving action, a planning action, a routing action, a motion control action, and/or the like.

The strategy module 142 may determine that one or more corrective actions are to be performed by determining a change in load (e.g., mass distribution, change in COG, change in load on distal ends of axles, change in ratio of loads on distal ends of axles, etc.) of the AV 101, and/or the like. The change in load may be responsive to a portion of the cargo being removed from the AV 101 or cargo shifting location in the AV 101. The corrective action may include causing the cargo to be verified, causing the cargo to be repositioned, preventing traveling of the AV 101, causing the AV 101 to travel to a location for verification of the cargo, providing an alert, and/or the like.

The strategy module 142 may determine that one or more corrective actions are to be performed by identifying a malfunctioning component of the AV 101. The identifying of the malfunctioning component may include determining a change in sensor data (e.g., displacement data, spring thickness data, etc.) when there was not a change in cargo (e.g., suspension is malfunctioning).

The strategy module 142 may determine that one or more corrective actions are to be performed by diagnosing chassis properties (e.g., chassis issues) of the AV 101. The diagnosing of the chassis properties may include determining that problems with one or more of the suspension, tires, and/or the like is causing a change in displacement of the AV 101.

The strategy module 142 may determine that one or more corrective actions are to be performed by determining a load of the AV 101 does not meet a threshold mass displacement value. For example, responsive to determining the vertical COG value is greater than a threshold height value, the load is to be rejected. In another example, responsive to determining the difference in or ratio of load values at distal ends of one or more axles exceeds a threshold amount, that the load is to be rejected.

In some embodiments, the strategy module 142 causes the corrective actions to be performed. The strategy module 142 may cause the corrective action to be performed by providing an alert, preventing the AV 101 from travelling, generating handling maneuver limits for the AV 101 (e.g., speed limits, acceleration limits, braking limits, turning limits, etc.), rejecting a load (e.g., the load of the AV 101 is to be adjusted or repositioned in the AV 101 to improve the mass distribution prior to being transported), causing the load of the AV 101 to be verified (e.g., to confirm whether a portion of the cargo has been removed or shifted position), providing instructions to the routing module 144 and/or the motion control module for controlling the AV 101, and/or the like.

In some embodiments, the routing module 144 receives data, such as route data 182, map data 186, and sensor data 194, physical data 196, etc., and generates, based on the data, short time horizon plan data. For example, routing module 144 receives route data 182 indicating that the AV 101 is to travel along a particular road, map data 186 indicating regulatory speed limits of the particular road, and sensor data 194 indicating locations of vehicles and/or objects proximate the AV 101. The routing module 144 generates, based on the route data 182, map data 186, and sensor data 194, short time horizon routing data including instructions (e.g., commands) of vehicle actions of the AV 101 for the next interval (e.g., 10 seconds). The routing module 144 transmits the short time horizon routing data to the motion control module 146 and the motion control module 146 controls one or more of the actuators (e.g., the vehicle systems 160) of the AV 101 based on the short time horizon routing data for the next interval (e.g., 10 seconds). The routing module 144 continues generating (e.g., regenerating, refreshing) short time horizon routing data (e.g., every 100 ms) (e.g., based on current route data 182, map data 186, and sensor data 194), transmitting the short time horizon routing data to the motion control module 146, and the motion control module 146 controls the actuators based on the short time horizon plan data.

In some embodiments, the strategy module 142 can interface with routing module 144 and motion control module 146. The operations of strategy module 142 are further described below in conjunction with the following Figures. The strategy module 142 identifies (e.g., retrieves from data repository 180 or receives from appropriate AV components or AV server) data, such as route data 182, topographic data 184, map data 186, vehicle data 188, historical data 192, sensor data 194, physical data 196, etc. In some embodiments, the strategy module 142 generates, based on the identified data, handling maneuver data 198 (e.g., based on physical data 196) for segments of a route to be traveled by AV 101. In some embodiments, the strategy module 142 applies one or more rules to the identified data (e.g., to specific parameters or characteristics in the identified data, based on the handling maneuver data 198).

In some embodiments, a rule specifies that a type of braking is to be used for a segment of a route responsive to the identified data meeting a threshold grade value, a threshold distance value, a threshold mass, a threshold mass distribution value, and/or a type of braking capability. In some examples, a rule specifies that friction braking is to be used responsive to the identified data including 2% or greater downhill grade value for the segment, a 0.1 mile or less distance value for the segment, a threshold mass of the AV, a threshold mass distribution value of the AV, and/or the AV having friction brakes. In some examples, a rule specifies that engine braking is to be used responsive to the identified data having 2% or greater downhill grade value, at least a 0.5 mile distance value, a threshold mass of the AV, a threshold mass distribution value of the AV, and/or the AV having engine braking capability.

In some embodiments, a rule specifies that a specific speed value (e.g., calculated speed, calculated maximum speed) is to be used for a segment of a route responsive to the identified data meeting a threshold grade value, a threshold distance value, a threshold mass, a threshold mass distribution value, and/or a powertrain capability (e.g., engine capability). In some examples, a rule specifies that a 30 mph speed value is to be used responsive to the identified data including 3% uphill grade value, at least a 0.5 mile distance value, a threshold mass of the AV, a threshold mass distribution value of the AV, and/or the AV having particular engine capability.

In some embodiments, a rule specifies a rate of deceleration value and/or speed value to be used for a segment of a route responsive to the identified data meeting a threshold grade value of the segment, a threshold radius of curvature value of the segment, and a total mass of the AV, and/or a threshold mass distribution value of the AV.

In some embodiments, a rule specifies a particular lane in which to travel responsive to the identified data indicating an upcoming merge or exit (e.g., route data 182) that is beyond the 10 second range for the instructions 220 (e.g., short time horizon route data), historical data 192 indicating in which lane vehicles typically travel, sensor data 194 indicating amount of vehicles that are proximate the AV 101, a threshold mass distribution value (e.g., likelihood of being able to swerve without rolling or brake if a vehicle merged onto the roadway in front of the AV 101), and/or the like.

The handling maneuver data 198 (e.g., driving constraint data, mass distribution-informed data, mass distribution-informed strategy data, handling maneuver strategy data, handling maneuvers limits) includes one or more of a corresponding type of braking for a corresponding segment of a route, a corresponding calculated maximum speed (e.g., less than a regulatory maximum speed) for a corresponding segment of the route based on physical limitations of the AV 101, a corresponding gear to be used for a corresponding segment of the route, a corresponding rate of change of speed for a corresponding segment of the route, a corresponding lane for a corresponding segment of the route, and/or the like.

In some embodiments, the handling maneuver data 198 includes an overall plan for a route. The handling maneuver data 198 can be used to generate a route from a starting point to a destination, determine a time of day to depart, determine an estimated arrival time, determine estimated handling maneuvers (e.g., speed, acceleration, braking, turning, lanes to use, etc.) for the route between the starting point and the destination, handling maneuvers limits (e.g., calculated speed limits, acceleration limits, braking limits, turning limits, etc.), and/or the like.

In some embodiments, the handling maneuver data 198 includes instructions (e.g., in the form of a script, commands, etc.), textual recommendations in a particular format, or any other type/format of data. The strategy module 142 may provide the handling maneuver data 198 to the routing module 144 and/or the motion control module 146. The routing module 144 may generate the instructions (e.g., short time horizon routing data) based on the handling maneuver data 198 (e.g., using a calculated maximum speed instead of a regulatory maximum speed, using a deceleration prior to a radius of curvature on a downhill grade, etc.).

In some embodiments, the routing module 144 receives route data 182 indicating the roads the AV 101 is to travel, map data 186 indicating details of the roads (e.g., regulatory speed limits, lanes, radius of curvature, etc.), sensor data 194 (e.g., indicating objects that are proximate the AV 101), the physical data 196, and/or the handling maneuver data 198 (e.g., what braking system to use, what speed to maintain, what gear to use, rate of change of speed, etc.). The routing module 144 can generate short time horizon routing data that includes instructions (e.g., script, commands, etc.) of how the AV 101 is to move for the next 10 seconds (e.g., continue in a straight line, steer to the left or right, accelerate, decelerate, maintain speed, etc.). The short time horizon routing data includes instructions based on the physical data 196 and/or handling maneuver data 198 (e.g., braking system, speed, gear, change of speed, etc.).

The motion control module 146 controls the actuators based on the short time horizon routing data and based on the handling maneuver data 198 (e.g., using a type of braking system). In some embodiments, the short time horizon routing data includes instructions (e.g., based on an updated speed limit calculated based on the physical data 196) and the motion control module 146 executes the instructions to control the vehicle systems 160. In some embodiments, the physical data 196 includes an indication of how to use the vehicle systems 160 (e.g., use a specific type of braking, use a particular gear, etc.) and the motion control module 146 generates instructions (e.g., script, commands) or adjusts instructions (e.g., script, commands) received from the routing module 144 to control the vehicle systems 160.

The use of the physical data 196 and/or handling maneuver data 198 provides mass distribution-informed optimization, such as decreasing wear-and-tear on the vehicle systems 160 of the AV 101, decreasing accumulated error, decreasing probability of collisions, providing energy savings (e.g., an energy savings action), and/or the like. An energy saving action can refer to a vehicle action that results in reduction of energy consumed by an AV 101. With respect to an AV 101 with an internal combustion engine (ICE), an energy saving action can include a fuel saving action. With respect to an AV 101 with an electric engine (e.g., electric motor) or hybrid AV, an energy saving action can include a power or electricity saving action. In some embodiments, an energy saving action can include at least one of a disengagement of a powertrain of the AV 101, a withholding of a supply of energy to an engine of the AV 101, or a regenerative energy action. Disengagement of a powertrain can include placing the AV 101 in neutral gear (e.g. coasting) or decoupling the power of the engine from the wheels. Withholding a supply of energy to an engine of the AV 101 can include reducing or stopping fuel injection to the ICE or reducing or stopping the electricity provided to the electric engine (e.g., motor). A regenerative energy action can include an action that returns to or generates energy for the AV 101. A regenerative braking technique that returns energy to the AV 101 through braking or other regenerative technique can be implemented.

In some embodiments, the strategy module 142 generates physical data 196 (e.g., COG values, mass values at distal ends of axles, ratios of mass at distal ends of axles) and provides the physical data 196 to the routing module 144 and/or motion control module 146. In some embodiments, the strategy module 142 generates handling maneuver data 198 (e.g., handling maneuver limits, speed limits, type of braking, acceleration limits, braking limits, turning limits, which lane to use, etc.) based on physical data 196 and/or sensor data and provides the handling maneuver data 198 to the routing module 144 and/or motion control module 146. In some embodiments, the strategy module 142 selects or updates a route, handling maneuver limits for the route, generates an overall plan for the route, etc. based on the physical data 196 (e.g., mass, mass distribution data) and/or handling maneuver data 198.

Figure 2:
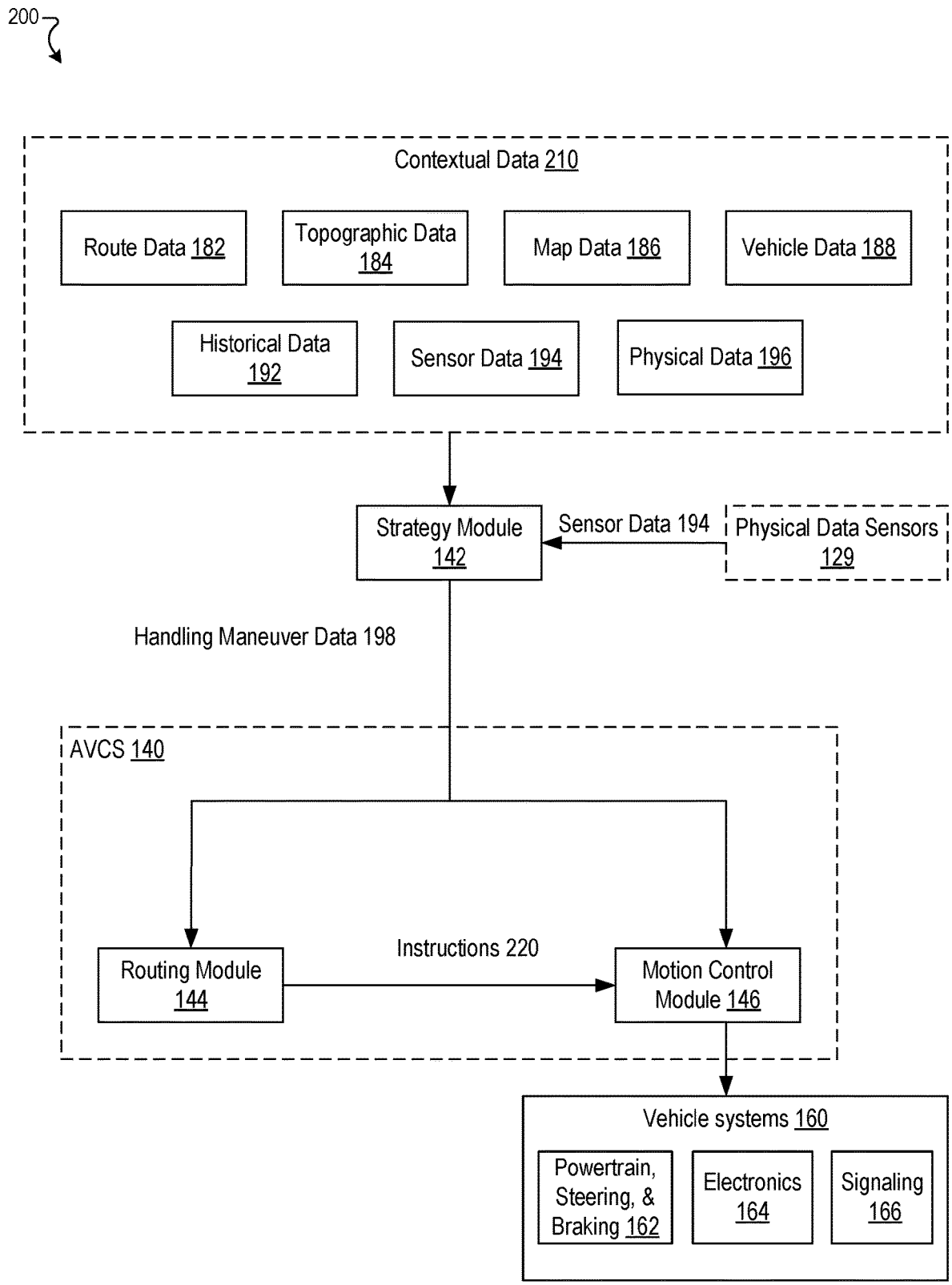
FIG. 2 is a diagram illustrating components of an example architecture of a system and example data flows pertaining to providing handling maneuver limits based on mass distribution data, in accordance with some embodiments of the disclosure.

FIG. 2 is a diagram illustrating components of an example architecture 200 of a system and example data flows pertaining to providing handling maneuver limits, in accordance with some embodiments of the disclosure. Components of FIG. 1 are used to help describe aspects of FIG. 2.

In some embodiments, the strategy module 142 provides handling maneuver limits (e.g., mass distribution-informed optimization) for the AV. In some embodiments, an AV server 150 includes the strategy module 142. In some embodiments, the AVCS 140 of the AV includes the strategy module 142.

The strategy module 142 receives contextual data 210, such as one or more of route data 182, topographic data 184, map data 186, vehicle data 188, physical data 196, historical data 192, sensor data 194, and/or the like. In some embodiments, strategy module 142 receives sensor data 194 from the vehicle systems 160 (e.g., data is exchanged between the strategy module 142 and the vehicle systems 160) and/or physical data sensors 129. In some embodiments, the strategy module 142 generates physical data 196 based on the sensor data 194. The strategy module 142 generates handling maneuver data 198 based on the contextual data 210. In some embodiments, the handling maneuver data 198 is a text file, a script, an executable binary file, and/or the like. In some embodiments, the strategy module 142 embeds the handling maneuver data 198 in other data, such as the map data 186. The strategy module 142 provides the handling maneuver data 198 (e.g., alone, embedded in other data, etc.) to the routing module 144 and/or the motion control module 146.

In some embodiments, routing module 144 is the primary authority and/or component involved in planning and decision making on positioning and operation of the AV. The routing module 144 receives data, such as the handling maneuver data 198, route data 182, map data 186, and sensor data 194, and makes decision about the positioning of the AV with respect to the external environment based on the data received.

The routing module 144 generates instructions 220 (e.g., short time horizon routing data associated with moving the AV over the next 10 seconds) based on at least a portion of the physical data 196 and transmits the instructions 220 to the motion control module 146. In some embodiments, the instructions 220 are in a file (e.g., a text file, etc.) and the motion control module 146 generates commands (e.g., script, instructions) to control the vehicle systems 160 based on the instructions 220. In some embodiments, the instructions 220 include commands (e.g., a script, instructions, etc.) and the motion control module 146 passes the commands (e.g., as received or after updating the commands) to the vehicle systems 160 to control the vehicle systems 160. The motion control module 146 executes the instructions 220 (e.g., commands, such as a calculated maximum speed limit) based on the handling maneuver data 198 (e.g., constraints, such as type of braking to use). In some embodiments, the AVCS 140 controls the position of the AV based on a very strict tolerance (e.g., within a few centimeters from the requested position). For example, the AVCS 140 can evaluate received data (e.g., sensor data 194 indicating location of objects proximate the AV) and determine a position of the AV with respect to the external environment to move the AV. In some examples, the routing module 144 receives the sensor data indicating that another vehicle is two seconds ahead of the AV. The routing module 144 then generates instructions 220 (e.g., short time horizon routing data) indicating that the braking system is to be actuated to cause the AV to be at least three seconds behind the other vehicle. In some embodiments, the motion control module 146 is expected to use the instructions 220 (e.g. in view of the handling maneuver data 198) within the constraints imposed by the instructions 220 (e.g. in view of the handling maneuver data 198) such that the position of the AV as determined by the AVCS 140 can be controlled with precision.

In some examples, handling maneuver data 198 can indicate, for a segment of a route, a calculated maximum speed (e.g., that is less than a regulatory maximum speed), a type of braking, a gear ratio to be used, a rate of deceleration, and/or a lane in which to travel. The strategy module 142 can send at least a first portion of the physical data 196 (e.g., the calculated maximum speed, rate of deceleration, lane in which to travel, etc.) to the routing module 144 and at least a second portion of the physical data 196 (e.g., type of braking, gear ratio, etc.) to the motion control module 146. The routing module 144 can generate instructions 220 (e.g., short time horizon routing data) for the next interval of time (e.g., 10 seconds) based on the at least a first portion of the physical data 196 (e.g., calculated maximum speed, rate of deceleration, lane in which to travel, etc.). The motion control module 146 can control the vehicle systems 160 based on the at least a second portion of the physical data 196 (e.g., type of braking and/or gear ratio of the physical data 196 and based on the instructions 220).

Figure 3:
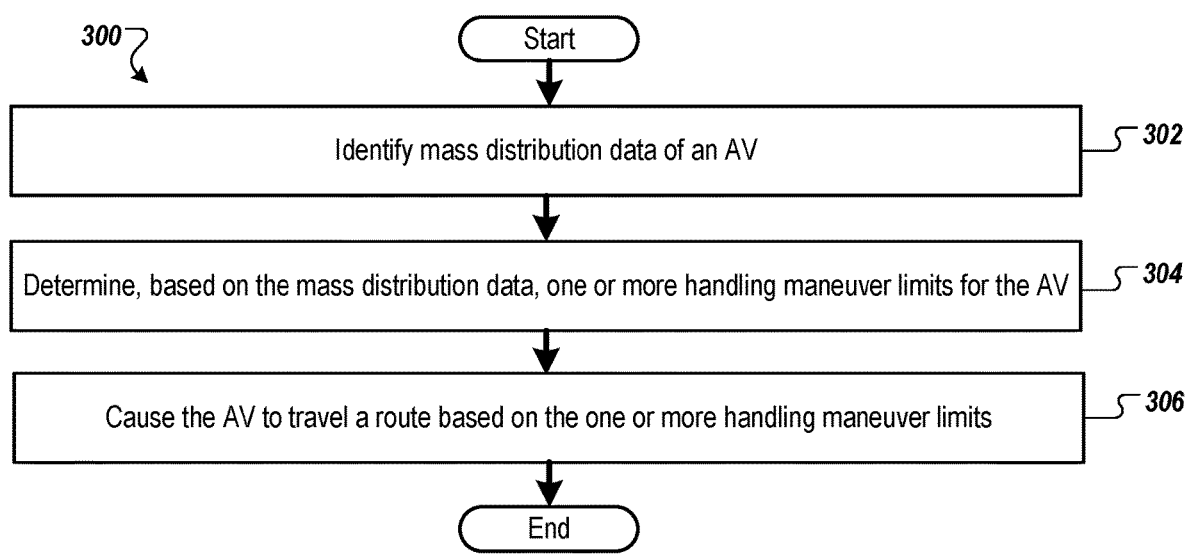
FIG. 3 depicts a flow diagram of an example method of providing handling maneuver limits based on mass distribution data, in accordance with some embodiments of the disclosure.

FIG. 3 depicts a flow diagram of an example method 300 of providing handling maneuver limits, in accordance with some embodiments of the disclosure. Method 300 and/or each of the individual functions, routines, subroutines, or operations of method 300 can be performed by a processing device, having one or more processing units (CPU) and memory devices communicatively coupled to the CPU(s). The processing device executing method 300 can be part of a server (located outside an autonomous vehicle, such as AV server 150) or a client processing module (located within or at the autonomous vehicle, such as AVCS 140), or any combination thereof. In some embodiments, method 300 can be performed by a single processing thread or alternatively by two or more processing threads, each thread executing one or more individual functions, routines, subroutines, or operations of the method. Method 300 as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 300 is performed by strategy module 142 described in FIGS. 1 and 2. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed.

Referring to FIG. 3, at operation 302 of method 300, processing logic identifies mass distribution data of an AV. In some embodiments, the mass distribution data is associated with a first load proximate a first distal end of a first axle of the AV and a second load proximate a second distal end of the first axle of the AV.

In some embodiments, the mass distribution data includes COG (e.g., vertical COG, lateral COG, longitudinal COG) of the AV (e.g., of the tractor and/or one or more trailers). In some embodiments, the mass distribution data includes a first mass value associated with a first distal end of a first axle and a second mass value associated with a second distal end of the first axle. In some embodiments, the mass distribution data includes a ratio of a first load proximate a first distal end of a first axle and a second load proximate a second distal end of the first axle. In some embodiments, the mass distribution data includes moment of inertia data of the AV. In some embodiments, the mass distribution data includes roll stiffness data of the AV. In some embodiments, the mass distribution data includes suspension stiffness data of the AV.

In some embodiments, the mass distribution data is one or more values or ratios associated with the distribution of the mass of the load of the AV (e.g., tractor and/or one or more trailers) over various axles and wheels of the AV. The mass distribution data can be used to choose an appropriate driving mode and level of risk (e.g., limiting trajectory of the AV).

In some embodiments, the mass distribution data is determined based sensor data associated with corresponding distal ends of one or more axles of an AV. The sensor data and/or mass distribution data can be stored in at least one data repository and can be retrieved from the at least one data repository. The processing logic can receive some or all of the sensor data from various components of an AV (e.g., physical data sensors of the AV), components that are not part of the AV (e.g., scales on which the AV is disposed), and/or from a server. The sensor data can include one or more of mass values at different distal ends of axles, weight values at different distal ends of axles, mass ratios of different distal ends of axles, weight ratios of different distal ends of axles, pressure values at different distal ends of axles responsive to the AV being leveled, displacement values at different distal ends of axles, suspension thickness values at different distal ends of axles, motion data (e.g., oscillation data of suspension springs, Eigen frequency data of the AV, frequency data of oscillation of the AV, frequency data of motion of the AV, etc.), and/or the like.

In some examples, the sensors are used to weigh the AV at individual wheels of the AV before the AV departs. In some examples, the sensors are air suspension bag pressure sensors (e.g., pressure sensors at bladders used to level the AV) that are used to determine the load of each axle (e.g., each distal end of each axle). Air pressure may be measured on each side of the trailer suspension to determine side-to-side (e.g., lateral) load. In some examples, sensor data from sensors that measure suspension deflection on the AV (e.g., tractor and/or trailer) is combined with suspension stiffness data (e.g., of suspension springs or air pressure bladders). In some examples, suspension deflection can be measured using laser sensors aimed at the AV (e.g., tractor, trailer) or surface under the AV (e.g., ground, roadway, etc.). In some examples sensors provide sensor data associated with the load on each axle (e.g., each distal end of each axle) in response to certain braking and/or acceleration maneuvers. The AV can proactively perform such pre-defined maneuvers (e.g., braking, accelerating, longitudinal motion, lateral motion, cornering, etc.) to determine mass distribution data (e.g., COG) by detecting how the load is transferred back and forth between axles and side-to-side between the wheels. The maneuvers may be performed early on in a driving mission (e.g., travelling a route).

At operation 304, the processing logic determines, based on the mass distribution data, one or more handling maneuver limits (e.g., handling maneuver data) for the AV. The handling maneuver limits may include one or more of type of braking of the AV, acceleration limits of the AV, jerk limits of the AV, yaw rate limits of the AV, type of evasive maneuvers of the AV, lane selection of the AV, turning limits of the AV, and/or the like.

In some embodiments, at operation 302, the processing logic identifies physical data (e.g., mass values, pressure values, displacement values, distance values, mass distribution values, etc.) and at operation 304, the processing logic determines, based on the physical data, the handling maneuver limits.

In some embodiments, operation 304 includes providing mass distribution data of the AV to a physics model (e.g., dynamical description of AV) and receiving, from the physics model, output of one or more handling maneuver limits. The physics model may describe dynamical response of the AV to forces (e.g., gravity, acceleration, braking, etc.) on the AV. The forces may be associated with one or more of corresponding type of road bank (e.g., gradient, angle, etc.), acceleration (e.g., longitudinal acceleration, lateral acceleration), jerk (e.g., change in acceleration, turning (e.g., lateral acceleration), corresponding type of braking (e.g., engine brakes, friction brakes, etc.), wind, and/or the like. In some embodiments, the physics model includes one or more rules or threshold values. Responsive to the sensor data (e.g., mass values) or physical data (e.g., mass distribution data, COG, etc.) meeting a rule or threshold value), the physics data outputs one or more handling maneuver limits. In some embodiments, the output of the physics model is cross-checked against a heuristic (e.g., roll-over threshold, etc.) and/or updated to not be greater than one or more threshold values (e.g., roll-over threshold value) to determine the handling maneuver limits.

In some embodiments, operation 304 includes selecting one or more handling maneuver limits from a look-up table based on the mass distribution data. In some examples, the look-up table includes one or more acceleration limits, braking limits, etc. for different values of COG.

In some embodiments, operation 304 includes determining the handling maneuver limits based on historical sensor data or historical mass distribution data of one or more AVs and historical handling maneuvers of the one or more AVs. For example, historical acceleration values, historical braking values, historical lanes, historical routes, etc. used by AVs that have mass distribution values that are similar to the AV may be used by the AV.

In some embodiments, the processing logic may select a route from a starting point to a destination based on the mass distribution data.

At operation 306, the processing logic causes the AV to travel a route based on the one or more handling maneuver limits. In some embodiments, operation 306 includes generating a plan to travel the route (e.g., handling maneuvers limits for each segment of the route) based on the handling maneuver limits. In some embodiments, operation 306 includes generating short time horizon route data for travelling a segment of the route (e.g., the next 10 seconds) based on the one or more handling maneuver limits. In some embodiments, operation 306 includes providing the handling maneuver limits to the routing module and/or the motion control module of the AV to control the AV.

In some embodiments, processing logic generates, based on the mass distribution data, handling maneuver data for segments of a route to be travelled by an AV. In some embodiments, the handling maneuver data includes context and/or constraints to improve actuator usage for one or more segments of the route.

Route data, topographic data, map data (e.g., roadway data, maximum and minimum speed limits, etc.), vehicle data (e.g., current vehicle configuration, total mass, wheelbase, etc.), best practices (e.g., professional driver strategies, heuristics, etc.), historical data (e.g., traffic, weather, etc.), sensor data, mass distribution data, and/or the like can be provided to the processing logic. The processing logic can incorporate this data to create the handling maneuver data for the segments of the route. The handling maneuver data for the segments of the route can include improved road and trajectory constraints for the routing module (e.g., altered location based maximum road speed limits, adapted location based trajectory limits, etc.) and additional context or constraints for the motion control module to improve actuator usage (e.g., recommended gear selection or representation of grade severity such as distance plus steepness, location based actuator strategies such as transmission, etc.).

In some embodiments, the handling maneuver data includes a corresponding type of braking for one or more segments of the route. In some examples, the handling maneuver data recommends friction braking (e.g., using friction brake pads) for a short downhill grade). In some examples, the handling maneuver data recommends downshifting (e.g., putting the AV in a lower gear) and/or engine braking instead of friction braking for a longer downhill grade. For a corresponding segment, the handling maneuver data may recommend one or more of regenerative braking, friction braking, engine braking, downshifting, exhaust braking, or using drive line retarders.

In some embodiments, the handling maneuver data includes a corresponding calculated maximum speed (e.g., lower than the regulatory maximum speed) for one or more segments of the route based on physical limitations of the AV. In some example, the calculated maximum speed is based on the total mass of the AV, the engine capabilities of the AV, etc.

In some embodiments, the handling maneuver data includes a corresponding gear (e.g., gear ratio) to be used for one or more segments of the route. In some embodiments, the corresponding gear is based on one or more of the calculated maximum speed, downshifting, deceleration, etc.

In some embodiments, the handling maneuver data includes a corresponding rate of change of speed (e.g., acceleration, deceleration) for one or more segments of the route. In some examples, handling maneuver data includes a recommended deceleration for a downhill grade with a radius of curvature.

In some embodiments, the handling maneuver data includes a corresponding lane for one or more segments of a route. In some examples, for a segment of the route where the AV is to merge onto another road, the handling maneuver data recommends that the AV be in a corresponding lane.

In some embodiments, the processing logic determines, based on the mass distribution data, a corrective action to be performed in association with the AV. The determining that a corrective action is to be performed may include one or more of determining a change in load (e.g., mass distribution data) of the AV, identifying a malfunctioning component of the AV, diagnosing a chassis issue (e.g., chassis property) of the AV), determining mass distribution data of an AV does not meet a threshold mass distribution, determining the AV is to travel an updated route, determining the AV is to travel with updated handling maneuver limits, and/or the like.

The processing logic may cause performance of the corrective action. The corrective action can include one or more providing an alert, preventing travel of the AV, causing verification of load (e.g., location or positioning of cargo) of the AV, travel of the AV to a location to be inspected, causing the AV to travel based on handling maneuver data (e.g., acceleration limits, braking limits, turning limits, which lanes to use, handling maneuver limits, etc.), selecting or updating a route for the AV to travel, and/or the like.

In some embodiments, in method 300, processing logic uses one or more types of physical data (e.g., mass per axle, total mass, etc.) instead of or in addition to mass distribution data. In some embodiments, causing the AV to travel the route based on the handling maneuver limits includes determining updated parameters and causing the AV to travel based on the updated parameters (e.g., updated output 440 corresponding to parameters 410 of FIG. 4).

Figure 4:
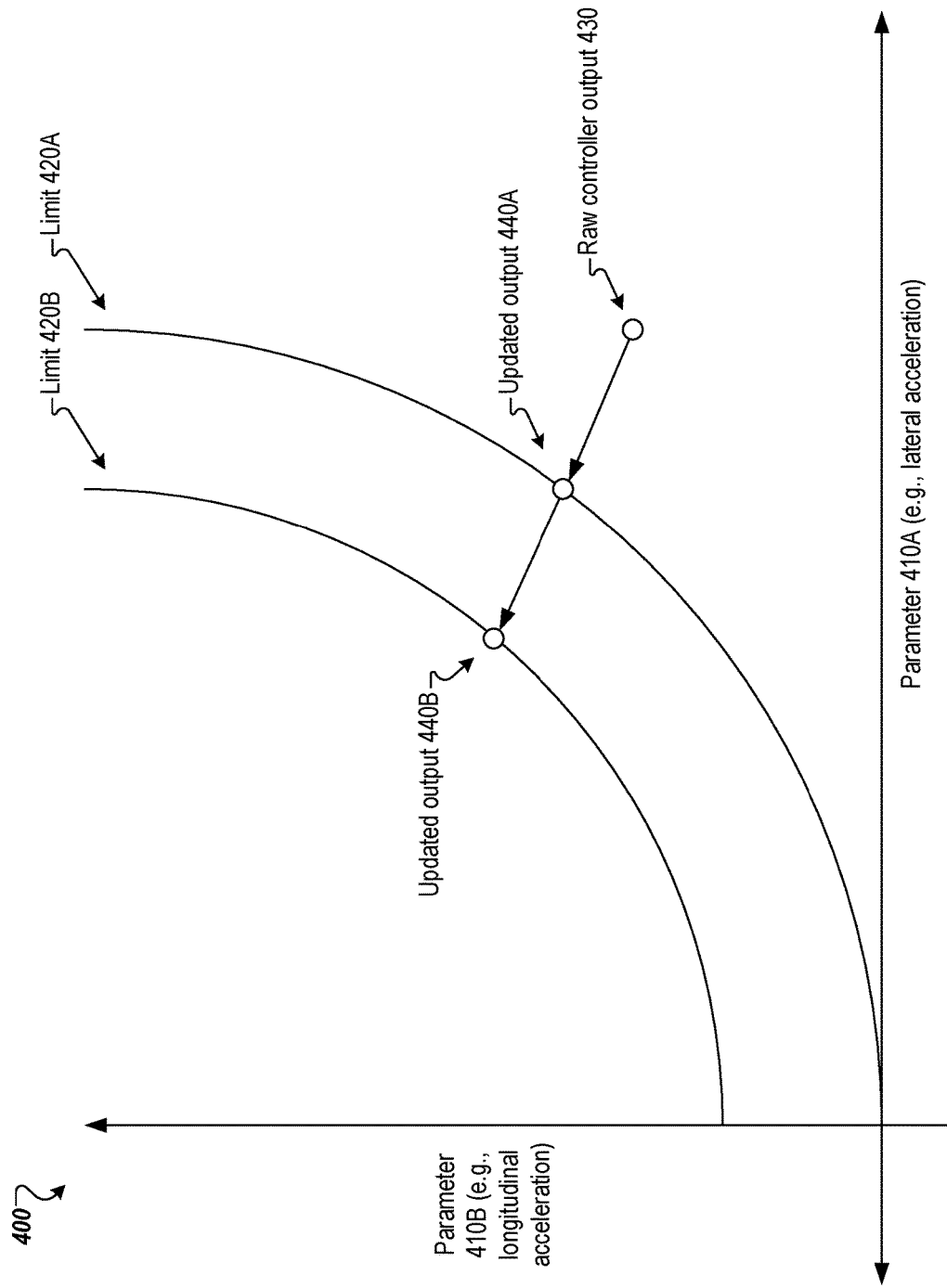
FIG. 4 illustrates a graph of using handling maneuver limits, in accordance with some embodiments of the disclosure.

FIG. 4 illustrates a graph 400 of using handling maneuver limits, according to certain embodiments. Graph 400 has a first axis corresponding to parameter 410A and a second axis corresponding to parameter 410B. In some embodiments, parameter 410A is lateral acceleration and parameter 410B is longitudinal acceleration. Lateral acceleration may include one or more of acceleration to the side, turning, cornering, evasive maneuver, changing lanes, and/or the like. Longitudinal acceleration may include one or more of acceleration within the same lane, acceleration towards the front of the AV, increasing speed or decreasing speed without turning, and/or the like.

One or more limits 420 (e.g., handling maneuver limits, handling maneuver data) may be generated (e.g., by strategy module 142 of FIG. 1, by processing device 502 of FIG. 5, etc.) based on physical data (e.g., mass distribution data, COG, mass values at different distal ends of one or more axles, etc.). The limits 420 may indicate one or more maximum parameters 410 (e.g., a maximum parameter 410A at a given parameter 410B and/or a maximum parameter 410B at a given parameter 410A).

In some embodiments, limit 420A is for a first mass distribution (e.g., lower height of vertical COG) and limit 420B is for a second mass distribution (e.g., greater height of vertical COG). In some embodiments, limit 420A is for a first mass distribution at one or more first conditions (e.g., weather conditions, visibility, wind, road traction, etc.) and limit 420B is for the first mass distribution at one or more second conditions.

Without taking into account the physical data (e.g., mass distribution data) of the AV, the AV may travel a route based on raw controller output 430 (e.g., output of routing module 144 and/or motion control module). By taking into account the physical data, the AV may travel the route at an updated output 440 (e.g., post-limit actuator command). In some embodiments, the updated output 440 is generated (e.g., by strategy module, by processing device, my routing module, by motion control module) based on a limit 420. In some embodiments, an updated output 440A is for a first mass distribution value (e.g., second COG) and updated output 440B is for a second mass distribution value (e.g., second COG).

In some embodiments, the strategy module generates the limits 420 and provides the limits 420 to the routing module and/or motion control module. The routing module and/or motion control module adjust one or more parameters 402 for controlling the AV based on the limits 420. In some embodiments, the strategy module.

In some embodiments, a limit 420 is for one or more parameters 410 (e.g., one parameter, two parameters, three parameters, four parameters, etc.). In some embodiments, a single parameter 410 is changed to meet the limit 420 (e.g., change lateral acceleration without changing longitudinal acceleration). In some embodiments, multiple parameters 410 are changed to meet the limit 420. In some embodiments, strategy module changes the parameters to meet the limits. In some embodiments, routing and/or motion control module changes the parameters to meet the limits. One or more rules may indicate which of the one or more parameters 410 are to change to meet the limits 420.

In some embodiments, the limits 420 are elliptical, rectangular, linear, step functions, and/or the like.

Figure 5:
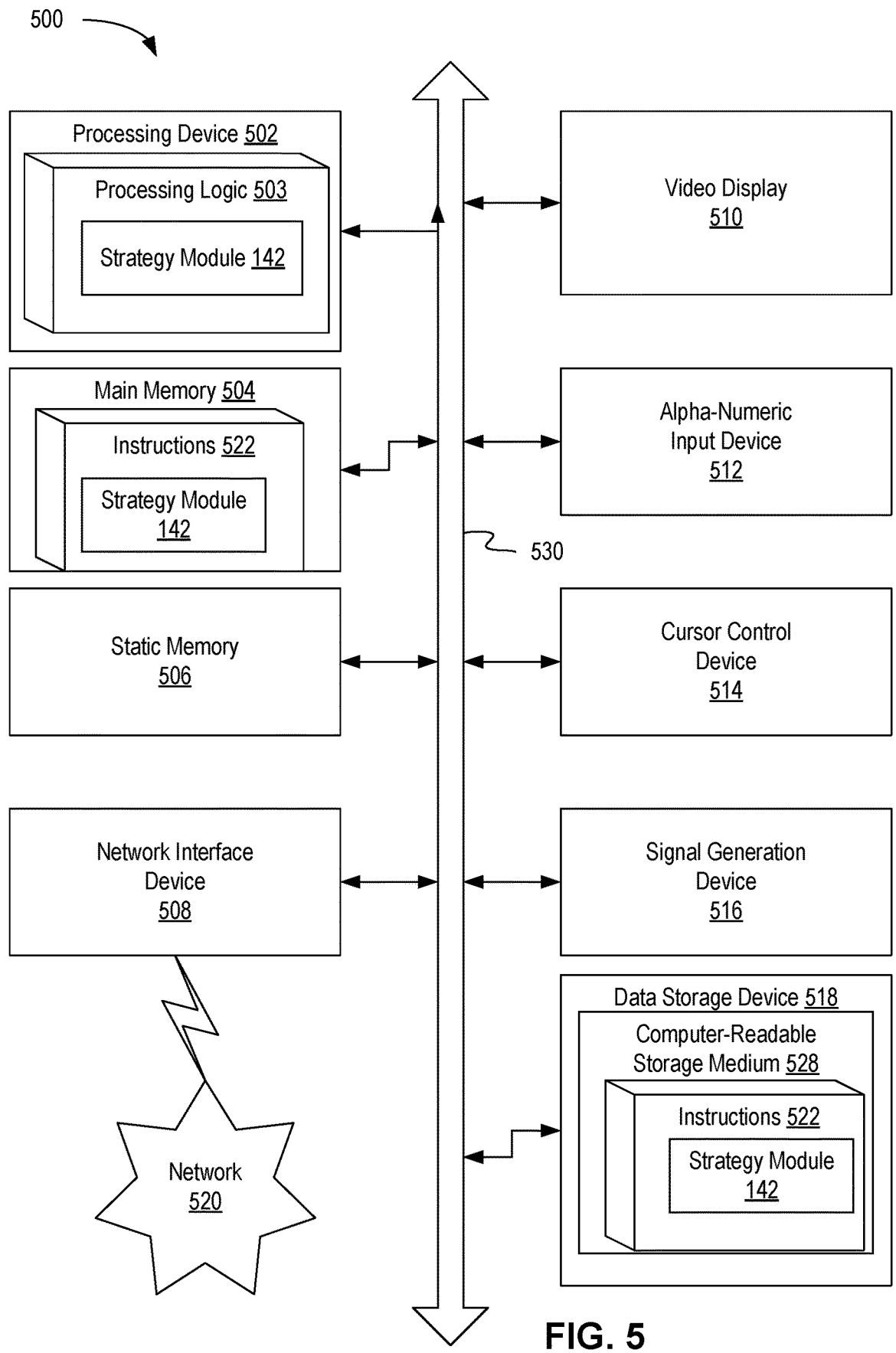
FIG. 5 depicts a block diagram of an example computer device within which a set of instructions, for causing the machine to perform any of the one or more methodologies discussed herein can be executed, in accordance with some embodiments of the disclosure.

FIG. 5 depicts a block diagram of an example computer device 500 within which a set of instructions, for causing the machine to perform any of the one or more methodologies discussed herein can be executed, in accordance with some embodiments of the disclosure. Example computer device 500 can be connected to other computer devices in a LAN, an intranet, an extranet, and/or the Internet. Computer device 500 can operate in the capacity of a server in a client-server network environment. Computer device 500 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" includes any collection of computers that individually or jointly execute a set (or multiple sets) of instructions to perform any one or more of the methods discussed herein. In some embodiments, the computer device 500 is AV server 150. In some embodiments, the AV 101 includes computer device 500 (e.g., AVCS 140 is computer device 500). In some embodiments, computer device 500 executes the strategy module 142.

Example computer device 500 can include a processing device 502 (also referred to as a processor or CPU), which can include processing logic 503, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which can communicate with each other via a bus 530.

Processing device 502 represents one or more general-purpose processing devices such as a microprocessor, central processing unit, or the like. More particularly, processing device 502 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. In accordance with one or more aspects of the disclosure, processing device 502 can be configured to execute instructions performing any of the operations performed by strategy module 142.

Example computer device 500 can further comprise a network interface device 508, which can be communicatively coupled to a network 520. Example computer device 500 can further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 can include a computer-readable storage medium (or, more specifically, a non-transitory computer-readable storage medium) 528 on which is stored one or more sets of executable instructions 522. In accordance with one or more aspects of the disclosure, executable instructions 522 can comprise executable instructions to perform any of the operations of strategy module 142.

Executable instructions 522 can also reside, completely or at least partially, within main memory 504 and/or within processing device 502 during execution thereof by example computer device 500, main memory 504 and processing device 502 also constituting computer-readable storage media. Executable instructions 522 can further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" includes any medium that is capable of storing or encoding a set of instructions for execution by the machine that cause the machine to perform any one or more of the methods described herein. The term "computer-readable storage medium" includes, but is not limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment," "one embodiment," "some embodiments," "an embodiment," "one embodiment," "some embodiments," or the like throughout may or may not mean the same embodiment or embodiment. One or more embodiments or embodiments described herein may be combined in a particular embodiment or embodiment. The terms "first," "second," "third," "fourth," etc. as used herein are meant as labels to distinguish among different elements and may not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
identifying mass distribution data of an autonomous vehicle (AV), wherein the mass distribution data comprises a first load value at a first distal end of a first axle of the AV and a second load value at a second distal end of the first axle of the AV;
selecting, based on the mass distribution data and road map data, a route from a starting location to a destination location;
determining an output corresponding to the AV travelling the route, wherein the output corresponding to the AV traveling the route comprises a maximum first parameter value and a maximum second parameter value;
determining, based on the first load value at the first distal end of the first axle and the second load value at the second distal end of the first axle, one or more handling maneuver limits for the AV to travel the route;
determining, based on the one or more handling maneuver limits, an updated output corresponding to the AV travelling the route, wherein the updated output corresponding to the AV traveling the route comprises an updated first parameter value and an updated second parameter value; and
causing the AV to travel the route based on the updated first parameter value and the updated second parameter value associated with the one or more handling maneuver limits.

2. The method of claim 1, wherein the one or more handling maneuver limits are further determined based on one or more of:
a vertical center of gravity (COG) of a trailer of the AV;
a lateral COG of the trailer of the AV; or
a longitudinal COG of the trailer of the AV.

3. The method of claim 1, wherein at least one of:
the first load value is a first mass value associated with the first distal end of the first axle and the second load value is a second mass value associated with the second distal end of the first axle; or
the one or more handling maneuver limits are further determined based on a ratio of the first load value to the second load value.

4. The method of claim 1, wherein the one or more handling maneuver limits are further determined based on one or more of:
   moment of inertia data of the AV; or
   roll stiffness data of the AV.

5. The method of claim 1, wherein the determining of the one or more handling maneuver limits comprises receiving, from a physics model, corresponding output of the one or more handling maneuver limits responsive to providing at least the first load value at the first distal end of the first axle and the second load value at the second distal end of the first axle of the mass distribution data to the physics model, wherein the physics model describes dynamical response of the AV to forces on the AV, the forces being associated with one or more of corresponding type of acceleration, jerk, turning, or corresponding type of braking.

6. The method of claim 5, wherein the forces are further associated with one or more of a corresponding type of road bank or wind.

7. The method of claim 1, wherein the determining of the one or more handling maneuver limits comprises selecting the one or more handling maneuver limits from a look-up table based on the mass distribution data.

8. The method of claim 1, wherein the determining of the one or more handling maneuver limits is based on historical sensor data of one or more AVs and historical handling maneuvers of the one or more AVs.

9. The method of claim 1 further comprising selecting the route based at least in part on one or more of the mass distribution data or the one or more handling maneuver limits for the AV.

10. The method of claim 1, wherein the one or more handling maneuver limits comprises:
    type of braking of the AV;
    acceleration limits of the AV;
    jerk limits of the AV;
    yaw rate limits of the AV;
    type of evasive maneuvers of the AV;
    lane selection of the AV; or
    turning limits of the AV.

11. The method of claim 1, wherein the causing of the AV to travel the route comprises generating a plan to travel the route based on the one or more handling maneuver limits.

12. The method of claim 1, wherein the causing of the AV to travel the route comprises generating short time horizon route data for travelling a segment of the route based on the one or more handling maneuver limits.

13. The method of claim 1, wherein the mass distribution data is of a trailer of the AV.

14. The method of claim 1, wherein:
    the output corresponding to the AV traveling the route comprises the maximum first parameter value and the maximum second parameter value without taking into account the mass distribution data of the AV; and
    the updated output corresponding to the AV traveling the route comprises the updated first parameter value and the updated second parameter value taking into account the mass distribution data of the AV.

15. The method of claim 1, wherein:
    the maximum first parameter value and the updated first parameter value correspond to lateral acceleration values; and
    the maximum second parameter value and the updated second parameter value correspond to longitudinal acceleration values.

16. The method of claim 15, wherein:
    the lateral acceleration values correspond to one or more of acceleration to a side, turning, cornering, evasive maneuver, or changing lanes; and
    the longitudinal acceleration values correspond to one or more of acceleration within a lane, acceleration towards a front of the AV, or adjusting speed without turning.

17. A system comprising:
    a memory device; and
    a processing device, coupled to the memory device, wherein the processing device is to:
       identify mass distribution data of an autonomous vehicle (AV), wherein the mass distribution data comprises a first load value at a first distal end of a first axle of the AV and a second load value at a second distal end of the first axle of the AV;
       select, based on the mass distribution data and road map data, a route from a starting location to a destination location;
       determine an output corresponding the AV travelling the route, wherein the output corresponding to the AV traveling the route comprises a maximum first parameter value and a maximum second parameter value;
       determine, based on the first load value at the first distal end of the first axle and the second load value at the second distal end of the first axle, one or more handling maneuver limits for the AV to travel the route;
       determining, based on the one or more handling maneuver limits, an updated output corresponding to the AV travelling the route, wherein the updated output corresponding to the AV traveling the route comprises an updated first parameter value and an updated second parameter value; and
       cause the AV to travel the route based on the updated first parameter value and the updated second parameter value associated with the one or more handling maneuver limits.

18. The system of claim 17, wherein the one or more handling maneuver limits are further determined based on one or more of:
    a vertical center of gravity (COG) of a trailer of the AV;
    a lateral COG of the trailer of the AV;
    a longitudinal COG of the trailer of the AV;
    a ratio of the first load value to the second load value;
    moment of inertia data of the AV; or
    roll stiffness data of the AV.

19. The system of claim 17, wherein to determine the one or more handling maneuver limits, the processing device is to receive, from a physics model, corresponding output of the one or more handling maneuver limits responsive to providing at least the first load value at the first distal end of the first axle and the second load value at the second distal end of the first axle of the mass distribution data to the physics model, wherein the physics model describes dynamical response of the AV to forces on the AV, the forces being associated with one or more of corresponding type of acceleration, jerk, turning, or corresponding type of braking.

20. A non-transitory computer-readable storage medium having instructions stored thereon that, when executed by a processing device, cause the processing device to:
    identify mass distribution data of an autonomous vehicle (AV), wherein the mass distribution data comprises a first load value at a first distal end of a first axle of the AV and a second load value at a second distal end of the first axle of the AV;

selecting, based on the mass distribution data and road map data, a route from a starting location to a destination location;

determining output corresponding to the AV travelling the route, wherein the output corresponding to the AV traveling the route comprises a maximum first parameter value and a maximum second parameter value;

determine, based on the first load value at the first distal end of the first axle and the second load value at the second distal end of the first axle, one or more handling maneuver limits for the AV to travel the route;

determining, based on the one or more handling maneuver limits, an updated output corresponding to the AV travelling the route, wherein the updated output corresponding to the AV traveling the route comprises an updated first parameter value and an updated second parameter value; and cause the AV to travel the route based on the updated first parameter value and the updated second parameter value associated with the one or more handling maneuver limits.

21. The non-transitory computer-readable storage medium of claim 20, wherein to determine the one or more handling maneuver limits, the processing device is to select the one or more handling maneuver limits from a look-up table based on the mass distribution data.

22. The non-transitory computer-readable storage medium of claim 20, wherein the processing device is to determine the one or more handling maneuver limits based on historical sensor data of one or more AVs and historical handling maneuvers of the one or more AVs.

23. The non-transitory computer-readable storage medium of claim 20, wherein the processing device is to select the route based at least in part on one or more of the mass distribution data or the one or more handling maneuver limits for the AV.

* * * * *